United States Patent [19]
Sinichenko et al.

[11] 3,824,760
[45] July 23, 1974

[54] METHOD AND INSTALLATION FOR FABRICATING, FILLING AND SEALING SACKS MADE FROM THERMOPLASTIC HOSE MATERIAL

[76] Inventors: Anatoly Afanasievich Sinichenko, ul. Gagarina, 54, kv. 24; Anatoly Mikhailovich Romanenko, prospekt Kosmonavtov, 7, kv. 3; Evgeny Alexeevich Sukhov, ul. Lisichanskaya, 55a, kv. 30; Grigory Fedorovich Markovsky, ul. Donetskaya, 52, kv. 53, all of Severodonetsk, U.S.S.R.

[22] Filed: Oct. 24, 1972

[21] Appl. No.: 300,363

[30] Foreign Application Priority Data
Oct. 25, 1971  U.S.S.R................................ 1708087

[52] U.S. Cl.......................... 53/29, 53/183, 53/243, 53/255

[51] Int. Cl.......................... B65b 9/14, B65b 43/00
[58] Field of Search 53/29, 183, 186, 187, 191–193, 53/243, 255

[56] References Cited
UNITED STATES PATENTS

| | | | |
|---|---|---|---|
| 2,721,017 | 10/1955 | Hiscock | 53/29 X |
| 3,374,599 | 3/1968 | Sanders | 53/29 |
| 3,492,775 | 2/1970 | Rhine et al. | 53/29 |
| 3,659,634 | 5/1972 | Ohring | 53/183 X |

Primary Examiner—Robert L. Spruill
Attorney, Agent, or Firm—Holman & Stern

[57] ABSTRACT

A method of fabricating, filling and sealing sacks made of thermoplastic hose material and an installation for accomplishing same are intended for packaging bulk and loose products. The method and the installation are simple, and reliable in operation.

7 Claims, 9 Drawing Figures

METHOD AND INSTALLATION FOR FABRICATING, FILLING AND SEALING SACKS MADE FROM THERMOPLASTIC HOSE MATERIAL

BACKGROUND OF THE INVENTION

The present invention relates to packaging, and more particularly, to a method of fabricating, filling and sealing sacks made of thermoplastic hose material and to the installation for effecting this method, can be successfully used for prepacking and packaging bulk, unitised and liquid products.

A device for fabricating, filling and sealing sacks made of thermoplastic hose material is known in the art.

The fabrication, filling and sealing of the sacks made of thermoplastic hose material is accomplished in the following manner.

The loose end of a flatly folded hose is drawn through a system of guiding rollers and is pulled from the top to the bottom over a hollow mandrel wrapping it up. After the mandrel has gotten inside the hose, the latter is drawn manually until it reaches the level of the hose welding devices where the first transverse seam is accomplished thus forming the bottom of the sack. Then the charging bar while moving in the direction of the mandrel cuts a slot in the hose with its sharpened edge and goes into the mandrel cavity through the charging hole in the wall of the mandrel. The product to be charged from the dosing device through the feeder and the telescopic bar is supplied to the mandrel cavity and through it to the lower part of the hose wherein the bottom has been already formed. After the charging bar is taken out of the mandrel hole, the guiding rollers are actuated by moving the hose with the product until it touches the belt of the fixed branch conveyer after which the welding device seals the sack, i.e., it accomplishes another seam by welding the section of the hose located over the product.

In this case, and simultaneously with the sealing of the sack, the cutter separates the sacks one from the other. The synchronising operation of all the elements of the installation ensures the arrangement of the slot cut by the charging bar at the level of the cutter. It is then necessary to disconnect the welding device and to actuate the conveyer which carries away the completed sack.

Thus, in the known device the bottom of the sack is formed by means of welding, then the sack is cut on one side and filled with the product through the slot so formed after which the sack is taken off the mandrel, the latter remaining immobile in the course of the packaging cycle to be followed by sealing the sack to be carried away.

However, the productivity of the aforementioned device is considerably reduced due to the operation of cutting the film with the movable bar of the charging device, taking the bar out of the mandrel and allowing more time to load the product through a comparatively small slot.

Besides, the necessary synchronisation of all the operations, such as coordination the movement of the charging bar with that of the hose film, cutting the slot and arranging it (after the hose with the product has been taken off the mandrel) at the level of the cutter to seperate one sack from the other, requires a additional means to accomplish it.

SUMMARY OF THE INVENTION

The object of the present invention is to eliminate the mentioned disadvantages.

Another object of the present invention is to provide the a method of fabricating, filling and sealing the sacks made of thermoplastic hose material which exclude the operations of cutting the hose film and introducing the product through the slot so formed, due to which productivity considerably increases.

Still another object of the present invention is to provide such an installation for accomplishing the above method having a simpler design as compared with known installations.

One more object of the present invention is to provide an installation for accomplishing the above method which would not require an additional means for synchronising the operations of fabricating, filling and sealing the sack.

In accordance with these and other objects the method of fabricating, filling and sealing the sacks made of thermoplastic hose material consisting in that the hose is pulled over a vertically-located hollow mandrel, with the open end of the hose being welded to form the bottom of the perspective sack and putting the hose into the mandrel, the former being filled with the product through the mandrel after which the filled hose is removed, while the hose and the mandrel are being moved with respect to each other and the subsequent section of the hose is being simultaneously pulled over the mandrel and the sack sealed by means of welding the section of the hose located over the product, according to the invention the hose is pulled over the mandrel from the bottom to the top, with the mandrel being filled with the product through the open end of the hose, and with the bottom of the sack being formed over the product after it has been loaded, whereupon the hose together with the mandrel and the product is turned about the horizontal axis from the turned-up position of the bottom of the sack into the turned-down position of the bottom and then the sack is sealed in the above-mentioned manner.

Thus, owing to these successive operations and the rotation of the hose with the product and the mandrel about the horizontal axis, it is possible to exclude the operations of cutting the hose and charging the product through the slot so formed. This contributes to a considerable increase in productivity without requiring the usual additional means which have made the facilities of accomplishing this method considerably complex as exhibited by the prior art.

The invention is further characterised in that the installation for accomplishing the proposed method also comprises a a reel-holder for the flatly-folded hose which is periodically drawn between the guiding rollers and pulled over the hollow mandrel, the latter being held in the vertical position at the moment of loading from the dosing-and-feeding device by means of a support system and limiting rollers which are fastened to the frame, and the device for welding the hose which forms the bottom of the sack and which seals it after it has been filled with the product, according to the invention; also the frame with the mandrel is installed so that it can rotate about the horizontal axis and is equipped with an additional support system which holds the mandrel when the frame is rotated, the mandrel being designed with provision for an additional opening of the hose on the section between the mandrel and the guiding rollers prior to loading the mandrel with the product from the dosing-and-feeding device, the installation being thus fitted with a means which limits the movement of the hose with the product in relation to the mandrel when the frame is rotated.

Due to the fact that the frame is provided with an additional support system preventing the mandrel from being moved due to the action of gravity forces when the frame is rotated, it is possible to utilize a vertical arrangement for the mandrel after it was rotated together with the frame from the position in which the bottom is formed to the position in which the loaded sack is sealed.

The mandrel, by virtue of its provision for an additional opening for the hose on the section between the mandrel and the guiding rollers prior to loading the product from the dosing-and-feeding device, enables the hose to be supplied along with a required amount of air which ensures unhindered slipping of the hose from the mandrel under the action of the weight of the product loaded into the hose at the moment of rotation of the mandrel about the horizontal axis. Otherwise, after pulling the hose off the mandrel and thereby decreasing the volume of the closed space in the hose, a drop of pressure will occur in the latter according to Boyle-Mariotte's law, i.e., a partial vacuum will set in, and as a result, the atmospheric pressure of the air acting on the walls of the hose portion pulled off the mandrel will prevent the product from coming out of the mandrel and into the sack which is a portion of the hose being pulled off the mandrel.

Another important feature of the present invention concerns the mandrel which is constructed in the form of a cup with an air-tight bottom provided with a rod which carries a slide capable of reciprocatory motion along the rod under the action of its weight, the side walls of the mandrel being fitted with longitudinal ribs which ensure a free flow of air between the hose and the side walls of the mandrel.

Due to the fact that the mandrel is constructed in the form of a cup with an air-tight bottom, and that the side walls of the mandrel are provided with longitudinal ribs, provision is made after the rotation of the mandrel for a free flow of air from the space over the mandrel to the mandrel and to the space below it which is necessary for the hose to slip unhindered from the mandrel.

The provision of the bottom of the mandrel having a rod on which the slide moves reciprocatingly under the action of its weight enables the slide to move after each rotation of the mandrel during the course of which the hose opens, and this, in turn, ensures that the required supply of air gets inside the hose, thus enabling it to slip down unhindered from the mandrel.

A further important additional feature of the present invention consists in that the rod is provided with a stop which has a provision for moving adjustably along the rod and is located between the bottom of the mandrel and the slide which limits the movement of the slide along the rod and its approach to the bottom of the mandrel and the first transverse seam, i.e., the bottom of the perspective sack is formed. After rotating the mandrel and the sack from the up-turned position of the bottom into the down-turned position of the bottom the slide, while moving the rod along, reaches the stop and opens up some portion of the hose on the section of the hose between the guiding rollers and the mandrel which results in an increase in the volume of the closed space initially formed in the hose after the latter has been filled with air through the open end and the bottom of the sack formed by welding. Also any increase in the volume of the closed space at a constant temperature results, according to Boyle-Mariotte's law, in a drop of the gas pressure inside this space. Thus, a small vacuum is formed in the sack thus preventing an air cavity from forming inside the sack which is very essential for protecting the sack during its subsequent calibration on the sack-straightening machine.

A further characteristic feature of the invention consists in that the means which limits the movement of the hose with respect to the mandrel is an arc-shaped guide containing a hole for the passage of the sack with the product, the hole being arranged co-axially with the mandrel which allows the hose to slip down from the mandrel under the action of the weight of the product loaded into it and at the moment when the hose with the product and the mandrel takes up a vertical position after the frame has been rotated and the neck of the sack is disposed at the level at which the welding device is arranged.

In accordance with another embodiment of the invention the means that limits the movement of the hose with respect to the mandrel represents a brake mounted on the additional support system.

These means in the installation prevent the hose from being arbitrarily pulled off the mandrel and serve as safety measures.

The invention is also characterised in the fact that the reel-holder of the flatly-folded hose is fastened to the frame and is to be mutually rotated which provides for a considerable increase in the production rate of the installation, as several mandrels and reel-holders can be secured to the frame and rotated mutually therewith.

Thus the method of fabricating, filling and sealing sacks made of thermoplastic hose material enables the rate of sack production to be increased considerably, and the installation for accomplishing this method is convenient for handling and is reliable in operation.

BRIEF DESCRIPTION OF THE DRAWINGS

The invention is further described to show how the method of fabricating, filling and sealing sacks made of flatly-folded hose, and how the installation for accomplishing this method may be carried into effect with reference, by way of example, being made to the accompanying drawings, in which.

DETAILED DESCRIPTION OF THE PREFERRED EMBODIMENTS

Figure 1:
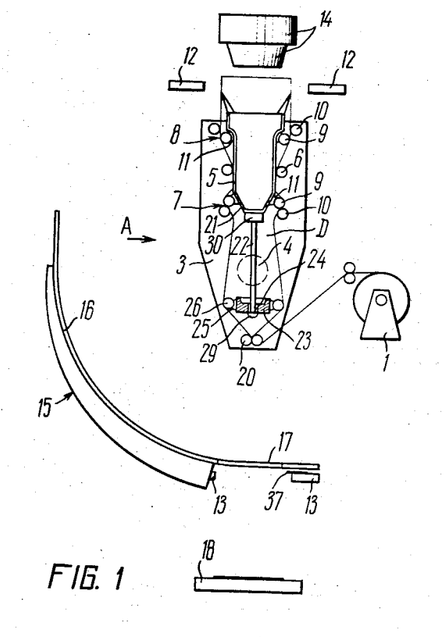
FIG. 1 is a diagrammatical view of the installation for fabricating, filling and sealing a sack made of hose thermoplastic material, according to the invention, while preparing it for operation, longitudinal section.
Figure 2:
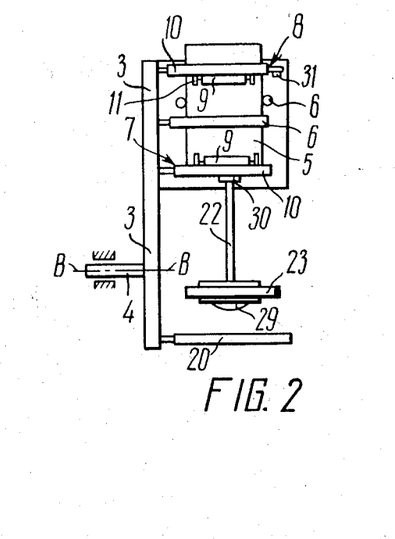
FIG. 2 is a view of the installation frame from the direction indicated by arrow A of FIG. 1.

The installation for fabricating, filling and sealing sacks made of thermoplastic hose material comprises a reel-holder 1 (FIG. 4) of the flatly-folded hose 2 and the frame 3 installed so that it can rotate about the horizontal axis B—B (FIG. 2). This is performed due to the fact that frame 3 which is fastened to the shaft 4 is rotatable, the use of an electric motor with a reduction gear or an open-type transmissions being employed as a drive (not shown in FIG. 1–9).

Provided on the frame 3 is a hollow mandrel 5 held in the vertical position by the limiting rollers 6 of the support system 7 and by an additional support system 8.

Figure 3:
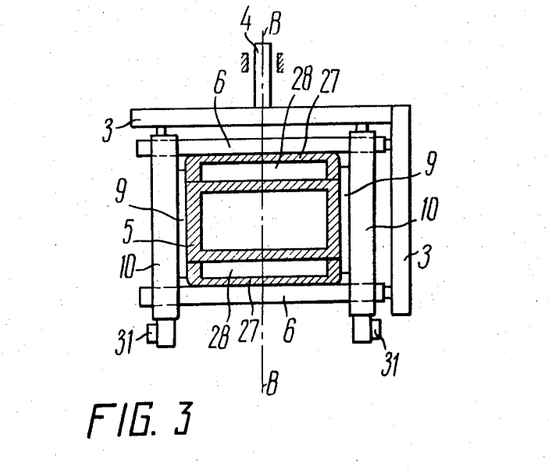
FIG. 3 the same as in FIG. 2, top view.

The limiting rollers 6 are fastened to the frame 3 and support the mandrel 5 at the four sides as shown in FIGS. 2 and 3.

The support systems 7 and 8 (FIG. 1) are made from two pairs of rollers 9 and 10. The rollers 9 of each pair are located on the bracket 11 fastened to the mandrel 5, and the rollers 10 of each pair are fastened with their shaft to the frame 3 (FIG. 2).

Figure 4:
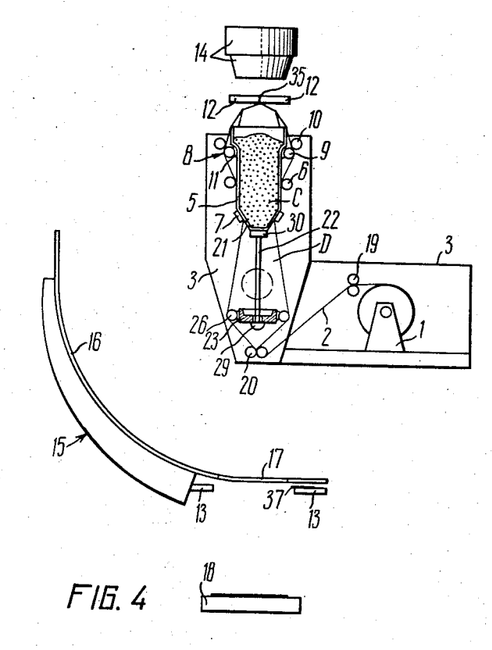
FIG. 4 is a diagrammatical view of the installation for fabricating, filling and sealing sacks made of hose thermoplastic material, with a reel-holder fastened to the frame.

The design arrangement of the support system 7 is not confined to the described embodiment as it can be constructed in the form of flat stops as shown in FIG. 4.

Above and below the frame 3 (FIG. 1) are respectively devices 12 and 13 for curing or sealing the hose, and use can be made of any suitable devices which are known to be used for this purpose and which are not described in detail herein as they are very well known for welding thermoplastic materials and are not the specific subject matter of the present application.

Located over the mandrel 5 somewhat higher than the welding or sealing device 12 is the dosing-and-feeding device 14 which supplies to the mandrel 5 a certain amount of product.

The installation is provided with a means 15 limiting the movement of the hose 2 with respect to the mandrel 5 when the frame 3 is rotated, the means having an arc-shaped guide 16 disposed along the trajectory of movement of the bottom of the sack when the frame 3 is rotated. The guide 16 is provided with a hole 17 arranged co-axially with the hollow mandrel and is used to admit the product to the sack therethrough. Under the hole 17 there is a conveyer 18 designed to carry away the loaded and sealed sacks.

Located between the mandrel 5 and the reel-holder 1 are two pairs of guiding rollers 19 and 20 through which the flatly-folded hose is drawn prior to its being pulled over the mandrel 5, with the pair of rollers 20 being fastened to the frame 3 with respect to the mandrel 5 as shown in FIG. 1–9, i.e., the contact point of these rollers being disposed on a line with the geometrical axis of the mandrel.

The hollow mandrel 5 is constructed so that it can open an additional portion of the hose of the section L between the mandrel 5 and the guiding rollers 20. With this object in view the mandrel 5 is made in the form of a cup, whose bottom 21 is made of a non air-tight material, for example, perforated metal, porous ceramics, and is provided with a rod 22 which carries the slide 23. The slide 23 is a workpiece having a rectangular form with a hole 24 in the center. Fastened to the side surface of the slide 23 are brackets 25 on which rollers 26 are located.

The rod 22 passes unobstructed through the opening 24 enabling the slide 23 to move freely in a reciprocating motion along the rod 22 under the action of its own weight.

Located on the side walls of the mandrel 5 are longitudinal ribs 27 (FIG. 3) which form ducts 28 ensuring a free flow of air between the hose 2 and the side walls of the mandrel 5.

The rod 22 (FIG. 1) is fitted with stops 29 and 30. The stop 29 is located on the free end of the rod 22 and is designed to prevent the slide 23 from falling from the rod, and the stop 30 is located near the bottom 21 of the mandrel 5 and is constructed so that it can move adjustably along the rod 22 and is designed to limit the movement of the slide 23 in the direction of the mandrel when the latter has turned to take up the position of sealing the loaded sack.

The installation of the present invention does not confine itself to the description of a specific embodiment, e.g., a mandrel or a means limiting the movement of the hose with respect to the mandrel when the frame is rotated, these can have another designs, for example, if the weight of the product is small enough so as to pull the loaded sack off the mandrel 5 and to wind the hose 2 off the reel-holder 1, it is expedient to provide an additional supporting system 8 with driving rollers which makes it possible to forcibly pull the sack off the mandrel and to wind the hose off the coil-holder.

The means 15 limiting the movement of the hose 2 with respect to the mandrel 5 can be accomplished in the form of a brake 31 (FIG. 3) mounted on the rollers of the additional support system 8, but if the rollers of this system are driving ones, there is no need to install a brake.

Any known device suitable for this purpose can be used as a brake 31.

The mandrel 5 (FIG. 1) can be made without a bottom (not shown in FIGS. 1–9). In this case the guiding rollers 20 will act as the bottom 21, and as this takes place it is expedient to make the mandrel 5 expanded at the bottom.

The frame 3 rotates reversably about the horizontal axis BB (FIG. 2) or just rotates about this axis making stops at two diametrically opposite points, i.e., under the dosing-and feeding device 14 (FIG. 1) and over the hole 17 of the guide 16.

When the frame 3 (FIG. 4) is to perform rotational movement, the reel-holder 1 must be fastened thereto, since the reel-holder rotates together with the frame 3 and the mandrel 5. In order to increase the production rate of the installation it is expedient to make the frame 3 in the form of a rotor 32 (FIG. 5) on which several mandrels 5 having the same number of reel-holders 1 are fastened, the latter being located between the mandrels 5 whose bottoms 21 are facing the center of the rotor.

Figure 5:
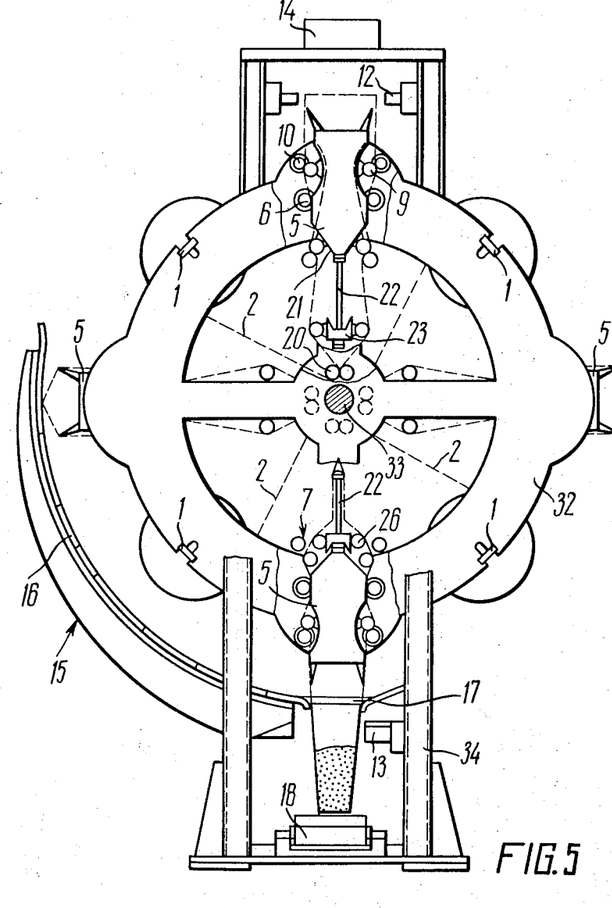
FIG. 5, the same as in FIG. 4 wherein the frame is constructed in the form of a rotor, front view.

The rotor 32 is fastened to the rotatable shaft 33 which is located in the supports of the stand 34.

The shaft 33 and accordingly the rotor 32 rotate intermitently and the number of stops that the rotor makes during one revolution amounts to the number of mandrels 5 installed thereon; it is expedient to have an even number of mandrels.

With such an installation design, one of the mandrels 5 is supplied with the product from the dosing-and-feeding device 14 and the bottom of the sack is formed by means of the welding device 12 whereas the hose 2 is pulled off the opposite mandrel and the sack filled with the product is sealed by the welding device 13.

The fabrication, filling and sealing of the sacks made of thermoplastic hose material on the described installation is performed in the following manner.

The flatly-folded hose 2 (FIG. 1) from the reel-holder 1 is pulled from the bottom over the mandrel 5 passing through the guiding rollers 19 and 20. As this takes place, the hose 2 passes between the rollers of the support system 7 for wrapping up the mandrel by passing the house between its walls and the limiting rollers and others.

Then the hose 2 is further passed between the rollers of the additional support system 8 and is drawn up to the level where the welding device 12 is arranged. This completes the preparation to the packaging cycle.

The packaging cycle itself then commences. The product C to be loaded from the dosing-and-feeding device 14 (FIG. 6) is introduced into the inner cavity of the mandrel 5, and the welding device 12 is acutated forming the first transverse seam, i.e. forming the bottom 35 of the perspective sack made up of this hose after loading it with the product (hose 2 is shown in FIG. 1–9 by the dot-and-dash line).

Figure 6:
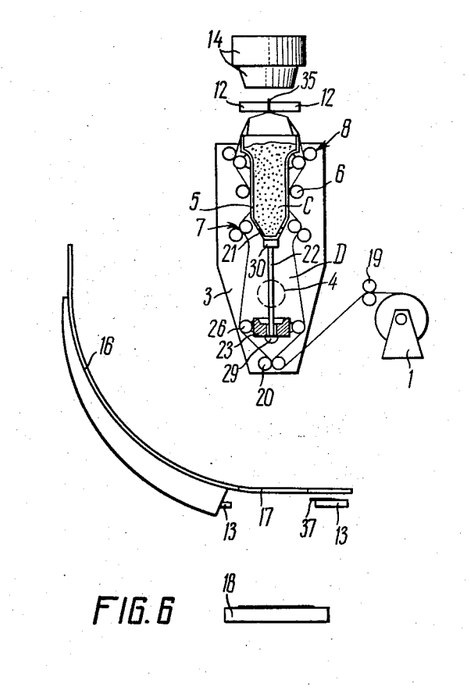
FIG. 6, the same as in FIG. 1 at the moment of forming the bottom of the sack.

The bottom 35 of the sack at this moment is over the product C loaded into the mandrel 5. Thus the mandrel 5 is first filled with the product C and then the bottom 35 of the sack is formed.

The welding device 12 (FIG. 7) then disengages and the frame 3 together with the hose 2, the mandrel 5 and the product C loaded into it is turned about the horizontal axis B—B by means of the driving shaft 4 so that the sack changes the position of the bottom 35 from the upward to the downward, and the mandrel 5 conversely changes the position of its bottom 21 from the downward to the upward, thereby ensuring the passage of the product C from the mandrel 5 into the hose 2, i.e., into the perspective sack.

Figure 7:
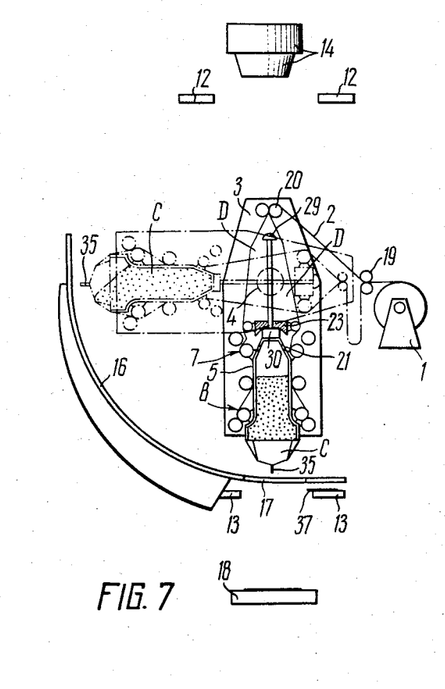
FIG. 7, the same as in FIG. 1 at the moment of mandrel rotation.

In this case, the sack is now located over the hole 17 of the arc-shaped guide 16 which prevents the hose 2 from slipping off the mandrel 5 before time when the frame 3 is rotated. Now the bottom 35 of the sack starts to take up the effect of the gravity forces of the product C and as a result, the sack and the product move downwards until they are brought in contact with the conveyer 18 (FIG. 8) which is immobile at that moment. Now that the sack (hose 2) is pulled off the mandrel 5 under the effect of the weight of the product C in the mandrel, the former flows from the mandrel 5 into the sack.

Figure 8:
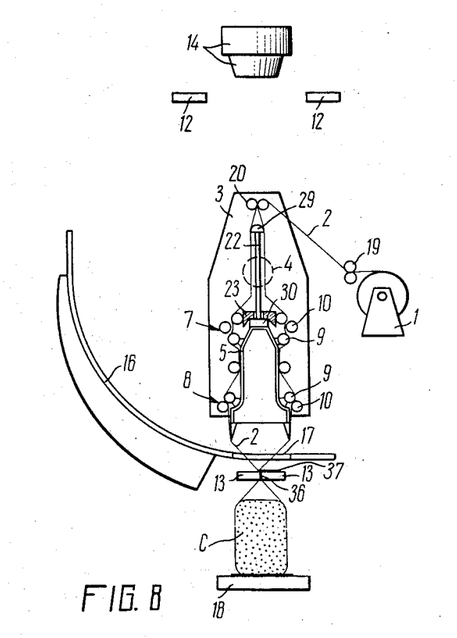
FIG. 8, the same as in FIG. 1 at the moment of sealing the sack.
Figure 9:
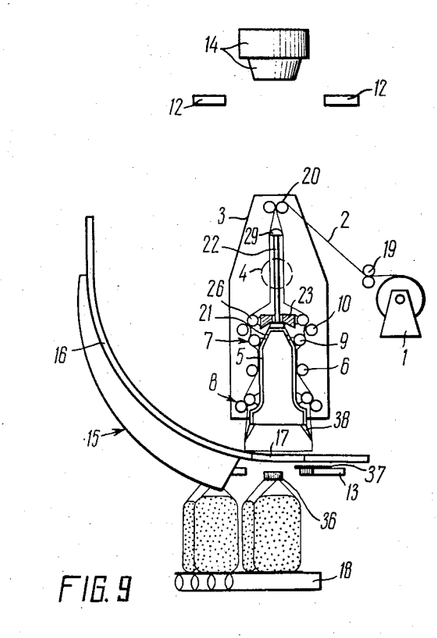
FIG. 9, the same as in FIG. 1 at the moment of transferring the finished sack on the conveyer.

Then the welding device 13 engages and seals the neck of the sack, i.e., the second transverse seam 36 is formed by means of welding the section of the hose 2 located over the product C. As this takes place, the cutter 37 fastened to the welding device 13 severs the sealed sack from the hose 2.

Then the welding device 13 (FIG. 9) disengages and the conveyer 18 is actuated to take the ready sack to the storage area and the end of the hose 2 pulled over the mandrel 5 is straightened with spring stops 38.

The frame 3 together with the mandrel 5 with the hose 2 pulled over it is further turned around into its initial position under the dosing-and-feeding device 14 positioning under it the open end of the hose 2 (FIG. 1).

After this the packaging cycle is repeated in the same order.

When the mandrel 5 is located under the dosing-and-feeding device 14, the slide 23 under the effect of its weight moves along the rod 22 as far as the stop 29 opening the hose 2 and forming the cavity D on the section L between the bottom 21 of the mandrel 5 and the guiding rollers 20. Since the bottom 21 of the mandrel 5 is made of air-tight material, the air unobstructedly gets into that portion of the hose, i.e., the required supply of air is built up in the hose 2. After loading the mandrel 5 (FIG. 6) with the product C and forming the bottom 35 of the sack, a closed space is formed in the hose 2 enclosing the product C, the mandrel 5 and a certain amount of air.

When the frame 3 and the mandrel 5 are rotated from the downward position of the bottom 21 into the upward position of the bottom 21 (FIG. 7) the slide 23 moves on the rod 22 approaching as closely as possible the bottom 21 of the mandrel 5, with the air freely passing along the ducts 28 (FIG. 3) from the space over the mandrel 5 (FIG. 7) into the cavity of the mandrel out of which the product C is discharged into the sack and the space below the mandrel, thus ensuring that the hose 2 will to be unobstructedly pulled off the mandrel 5 under the effect of the weight of the product C. As the hose 2 is pulled off the mandrel 5, the former is wound off the reel-holder 1 and a new section 2 is pulled over the mandrel 5 (FIG. 8).

Since the rod 22 is provided with the stop 30 which can be fixed adjustably along the rod 22, the slide 23 can be limited in its movement to the bottom 21 of the mandrel 5 after the latter is turned into the bottom upward position. If the slide 23 is restricted from approaching the bottom of the mandrel 5 after its rotation by means of the stop 30, some portion of the hose 2 on the section between the guiding rollers 20 and the mandrel 5 are formed from a new part of the hose as a result of its winding off and will be opened, thus increasing the volume of the closed space in the hose 2 which was initially created in it by the entrance of air through the open end after the bottom 35 of the sack was formed.

Since any increase in the volume of the closed space at a constant temperature results according to Boyle-Mariotte's law in the pressure reduction of the gas inside this space, and a small vacuum will be set up inside the hose 2 which makes it possible to prevent the formation of an air cavity inside the sack, this being very essential for preventing the sack from being damaged when it is subsequently calibrated on the sack-straightening machine.

The installations shown in FIG. 4 and 5 may operate in an analogous manner with the only difference being that the frame 3 or the rotor 32 does not rotate reversably about the horizontal axis as is the case with the above described installation, but may revolve interruptedly about this axis.

Thus, the proposed method for fabricating, filling and sealing sacks made of thermoplastic hose material ensures not only a rapid packing of the product, but also creates a small vacuum in the sacks making them convenient to transport.

What is claimed is:

1. A method of fabricating, filling and sealing sacks made of thermoplastic hose material comprising the steps of: drawing a section of hose from a reel of hose over a vertically-located hollow mandrel from the bottom to the top thereof; loading a product into the mandrel through the open end of the hose, which is pulled over the mandrel; welding the open end of the section of hose, enclosing therein the mandrel and the product to form over the product loaded into the mandrel, the bottom of a perspective sack; rotating the hose with the mandrel and the product sealed thereinside at one end about a horizontal axis from the up-turned position of the formed bottom of the sack into the down-turned position of the bottom so that the mandrel and the hose are moved with respect to each other, and the product from the mandrel is transferred into the hose, thus filling the section thereof with the product; permitting the section of the hose containing the product to be pulled from the mandrel; sealing by means of welding the section of the hose containing the product in order to obtain a sealed sack which is filled with the product; and separating the sealed sack from the reel of hose.

2. An installation for fabricating, filling and sealing sacks made of thermoplastic hose material consisting of a holder for holding a reel of flatly-folded hose; frame means mounted to rotate about a horizontal axis; drive means for rotating said frame means; a hollow mandrel fastened to said frame means to be rotatable therewith; a plurality of guiding rollers operatively located between said holder and the mandrel so that a section of the hose from said holder may be drawn between them and pulled over the mandrel from the top to the bottom thereof; a roller support system fastened to said frame means and enveloping and supporting the mandrel; a plurality of limiting rollers fastened to said frame means for holding said frame means in a vertical position at a moment of loading at which moment a product is supplied to fill said mandrel through the open end of said section of hose drawn thereover; an additional support system fastened to said frame means and enveloping said hollow mandrel and preventing the latter from being moved during a rotational invertion of the mandrel with said frame means occurring after the product has been loaded into the mandrel; said hollow mandrel having means for opening the hose wider on the section of hose between the mandrel and said guiding rollers prior to said moment of loading; a dosing-and-feeding device located over said mandrel for loading the product into the latter through said open end of the drawn hose; first welding means for welding said open end of the hose to form the sealed bottom of an eventually formed sack; means for limiting any movement of the hose with respect to said mandrel during said rotational invertion of said frame means whereby during said rotational invertion the product initially loaded in the mandrel is transferred to the sealed bottom section of hose, which transfer is complete after total invertion of the mandrel whereupon the thus loaded sealed section of hose is released from the mandrel; second welding means for closing the released section of loaded hose to thus form a totally sealed sack made from thermoplastic hose.

3. An installation as claimed in claim 2 wherein the mandrel is made in the form of a cup with an air-tight bottom provided with a rod upon which a slide is located which can move reciprocatingly over the former under the effect of its own weight, the exterior side walls of the mandrel being provided with longitudinal ribs ensuring the free passage of air between the hose and the side walls of the mandrel.

4. An installation as claimed in claim 3 wherein the rod is provided with a stop which can move adjustably along the rod and is located between the bottom of the mandrel and the slide.

5. An installation as claimed in claim 2 wherein said means for limiting the movement of the hose with respect to the mandrel is an arc-shaped guide with a hole arranged co-axially with the mandrel for the sack with the product to be admitted through it.

6. An installation as claimed in claim 2 wherein said means for limiting the movement of the hose with respect to the mandrel is a brake mounted on the rollers of the additional support system.

7. An installation as claimed in claim 2 wherein said holder of the flatly folded hose is fastened to said frame means to be rotatable therewith.

* * * * *